US012745876B2

(12) United States Patent
Altenritter

(10) Patent No.: US 12,745,876 B2
(45) Date of Patent: Sep. 29, 2026

(54) PELLET GRILLS HAVING PELLET LEVEL DETECTION SYSTEMS AND RELATED METHODS

(71) Applicant: Traeger Pellet Grills, LLC, Salt Lake City, UT (US)

(72) Inventor: Daniel A. Altenritter, Riverton, UT (US)

(73) Assignee: Traeger Pellet Grills, LLC, Salt Lake City, UT (US)

(*) Notice: Subject to any disclaimer, the term of this patent is extended or adjusted under 35 U.S.C. 154(b) by 0 days.

(21) Appl. No.: 16/734,077

(22) Filed: Jan. 3, 2020

(65) Prior Publication Data

US 2020/0214503 A1 Jul. 9, 2020

Related U.S. Application Data

(60) Provisional application No. 62/788,805, filed on Jan. 5, 2019.

(51) Int. Cl.
*A47J 37/07* (2006.01)
*F24B 13/04* (2006.01)

(52) U.S. Cl.
CPC ........... *A47J 37/0786* (2013.01); *F24B 13/04* (2013.01)

(58) Field of Classification Search
None
See application file for complete search history.

(56) References Cited

U.S. PATENT DOCUMENTS 4,922,889 A 5/1990 Nuesmeyer et al.
5,135,485 A * 8/1992 Cohen .................. G01F 23/268 604/67
6,148,668 A 11/2000 Sieg
2009/0126714 A1* 5/2009 Barkhouse ............. F23N 1/002 126/39 G
2010/0025509 A1* 2/2010 Matlin .................. G01F 23/292 241/100
2011/0073101 A1 3/2011 Lau et al.
2014/0150698 A1* 6/2014 Walker .................... F23B 50/12 110/118
2017/0091585 A1* 3/2017 Israelson ................... G06T 7/11
2017/0164783 A1 6/2017 Sauerwein et al.

FOREIGN PATENT DOCUMENTS

CN 1646048 A 7/2005
CN 206213868 U 6/2017
EP 2105666 A2 9/2009

OTHER PUBLICATIONS

European Search Report and Opinion for European Application No. 20150253.1, dated May 8, 2020, 8 pages.

(Continued)

*Primary Examiner* — Jason Lau
(74) *Attorney, Agent, or Firm* — TraskBritt

(57) ABSTRACT

A pellet grill includes a detection system configured to detect at least one pellet level in a hopper of the pellet grill. The detection system can include at least one sensor that is configured to detect at least one condition in the hopper of the pellet grill. The detection system may optionally include a communications module that is configured to notify a user of the at least one pellet level in the hopper of the pellet grill.

15 Claims, 6 Drawing Sheets

(56) References Cited

OTHER PUBLICATIONS

Canadian Office Action from Canadian Application No. 3066299, dated Apr. 13, 2021, 3 pages.
Chinese Office Action and Search Report from Chinese Application No. 202010010367.7, dated Feb. 21, 2022, 15 pages.
Chinese Reexamination Notice for Application No. 202010010367.7 dated Mar. 23, 2026, 18 pages with machine translation.
European Communication pursuant to Article 94(3) EPC for European Application No. 20150253.1, dated Jan. 12, 2026, 8 pages.

* cited by examiner

PELLET GRILLS HAVING PELLET LEVEL DETECTION SYSTEMS AND RELATED METHODS

CROSS-REFERENCE TO RELATED APPLICATION

This application claims the benefit under 35 U.S.C. § 119(e) of U.S. Provisional Patent Application Ser. No. 62/788,805, filed Jan. 5, 2019, the disclosure of which is hereby incorporated herein in its entirety by this reference.

TECHNICAL FIELD

The present disclosure relates generally to systems, methods, and devices for grilling and cooking food products.

BACKGROUND

Consumers use a variety of grilling devices for cooking food products. Numerous grilling devices utilize pellets or other fuel to cook food. Pellet grills allow users to smoke, bake, and grill food. However, traditional pellet grills are generally not user-friendly for grill novices, so manufacturers have increasingly automated pellet grills to make them easier to use. Because of their versatility and automation, consumers are increasingly choosing pellet grills over other types of grills, such as gas or charcoal grills.

Nevertheless, there are still a number of disadvantages relating to pellet grills and their automation that can be addressed.

BRIEF SUMMARY

Embodiments of the present disclosure comprise systems, methods, and apparatus configured to detect pellet levels within a hopper of a pellet grill. In particular, at least one embodiment of the present disclosure comprises a pellet grill having a detection system configured to detect when a pellet level in a hopper of the pellet grill has dropped below a predetermined threshold.

The detection system can include at least one sensor that is coupled to the pellet grill and configured to detect at least one condition in a hopper of the pellet grill. Additionally, the detection system can include a communications module that is configured to notify a user of the at least one pellet level in the hopper of the pellet grill.

Further, embodiments of the present disclosure include at least one method for detecting at least one pellet level in a hopper, wherein the method includes detecting at least one pellet level in a hopper. In at least one implementation, the method further comprises notifying the user of the at least one pellet level in the hopper.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of embodiments of the present disclosure can be obtained, embodiments of the disclosure are described herein below and explained with additional specificity and detail through the use of the accompanying drawings in which.

DETAILED DESCRIPTION

Figure 1:
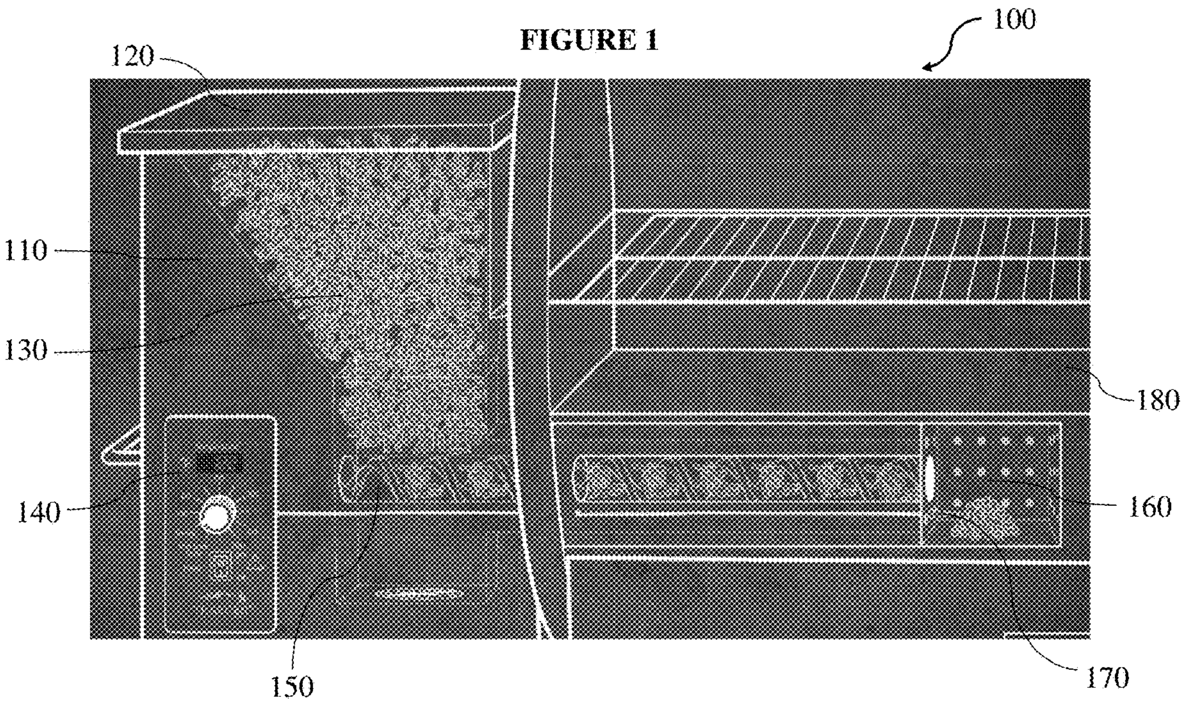
FIG. 1 depicts an exemplary pellet grill with an attached hopper in accordance with at least one embodiment of the present disclosure.

Embodiments of the present disclosure relate to systems, methods, and apparatus configured to detect pellet levels within a hopper of a pellet grill. In particular, at least one embodiment of the present disclosure comprises a pellet grill having a detection system configured to detect when a pellet level in a hopper of the pellet grill has dropped below a predetermined threshold.

As stated above, numerous grilling devices utilize pellets or other fuel to cook food. Pellet grills typically comprise a main grilling or smoking chamber in which food is grilled and/or smoked, as well as an external cavity that holds pellets before they are combusted within a firepot to grill or cook food. Those skilled in the art often refer to this external cavity as a hopper. The hopper typically connects to an auger system that slowly moves pellets from the hopper to a firepot, which is situated within the main cooking. In conventional implementations, the auger system connects to the bottom of the hopper. A heating element within the firepot combusts the pellets as they reach the firepot, thus providing heat with which to cook and/or warm food products.

To effectively cook with a pellet grill as described above, generally, the pellet grill must retain a constant supply of pellets in the hopper. When the hopper runs out of pellets, the pellet grill will no longer produce heat, as the heating element will no longer have a supply of combustible pellets from the auger system.

Further, because pellet grill cook times can be longer than the time it takes for the pellet grill to consume a hopper full of pellets, users are required to continually monitor the pellet level in the hopper and refill the hopper. Accordingly, at least one embodiment of the present disclosure comprises a detection system configured to detect at least one pellet level in a hopper and notify the user of the at least one pellet level.

Certain pellet grill hoppers also have the tendency to empty in a non-uniform manner. This non-uniform manner can be emptying from the center or from a specific side first, leading to uneven levels of pellets within the hopper. In some situations, the non-uniform emptying of the hopper can result in a blockage of pellets being fed into the auger system, resulting in no pellets being fed into the auger system even though there are still pellets within the hopper. Embodiments of the present disclosure address this issue either by measuring the pellet level in the center of the hopper or measuring the pellet level at various points along the sides of the hopper along the same horizontal plane. In other words, a sensor or a plurality of sensors may be used to measure the level of pellets at a plurality of different locations within the hopper at any given time.

Also, hoppers generally have lids that need to remain shut to prevent moisture from causing the pellets to swell and become unusable as fuel. Therefore, it is generally not practicable to require a user to continually visually monitor pellet levels within hopper by opening the hopper lid. Therefore, embodiments of the present disclosure may allow a manufacturer or user to determine the level of pellets in the hopper without lifting the hopper lid.

One skilled in the art will appreciate that, as used herein, the term "pellet" is used to indicate any solid particulate fuel source. The fuel can comprise wood or charcoal pellets, balls, discs, logs, etc., of any size. Further, fuel can also comprise other plant-based biofuel, like hemp, coffee grinds, sugar cane, hay, etc. Oil or wax-based fuel can also be used in connection with the present disclosure. Likewise, the term "pellet grill" is used to indicate a grill that converts any sized or shaped particulate fuel into energy. The present disclosure is not limited to any type of grill or the type of fuel.

Additionally, one skilled in the art will appreciate that as used herein, the term "light" is used to indicate electromagnetic radiation having any wavelength(s). Any light emitted is not limited to electromagnetic radiation having a wavelength within the visible light spectrum. Light may have a wavelength anywhere from $10^{-14}$ nm to $10^{-4}$ m. Similarly, the term "sound" is used to indicate sound having any amplitude, frequency, wavelength, etc.

FIG. 1 depicts an exemplary pellet grill 100 and an attached hopper in accordance with at least one embodiment of the present disclosure. As shown in FIG. 1, the pellet grill 100 includes an attached hopper 110 with a hopper lid 120. A user can fill the hopper cavity 130 with pellets and use a temperature gauge 140 to control the rate at which an auger system 150 feeds the pellets into the firepot 160. Once the pellets reach the firepot 160, a heating element 170 can combust the pellets and provide heat to the main grilling cavity 180. Although not shown, the pellet grill 100 can also include an active cooling fan with actuating louvers and/or additional fans that actively cool the pellet grill 100.

Figure 2:
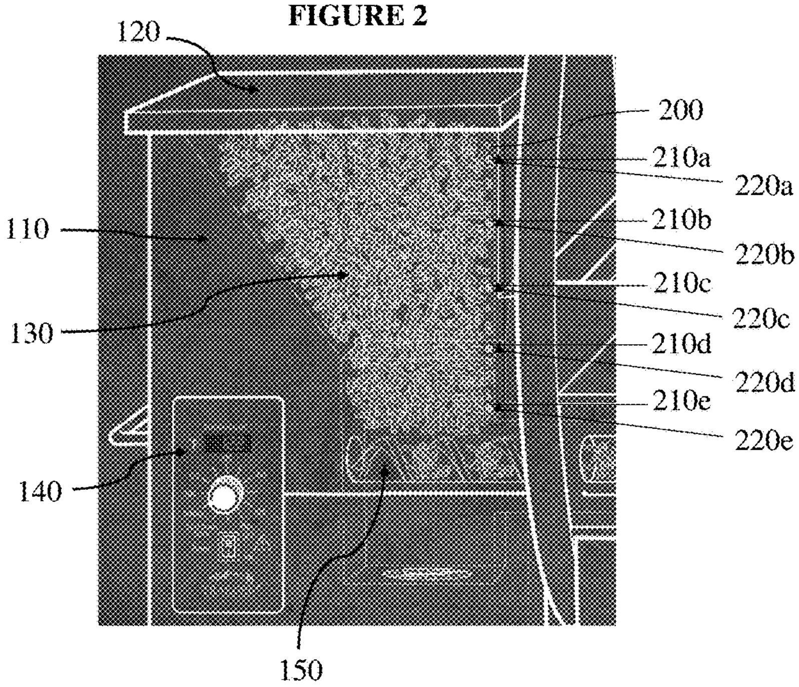
FIG. 2 depicts a hopper with a light-based detection system in accordance with at least one embodiment of the present disclosure.
Figure 3:
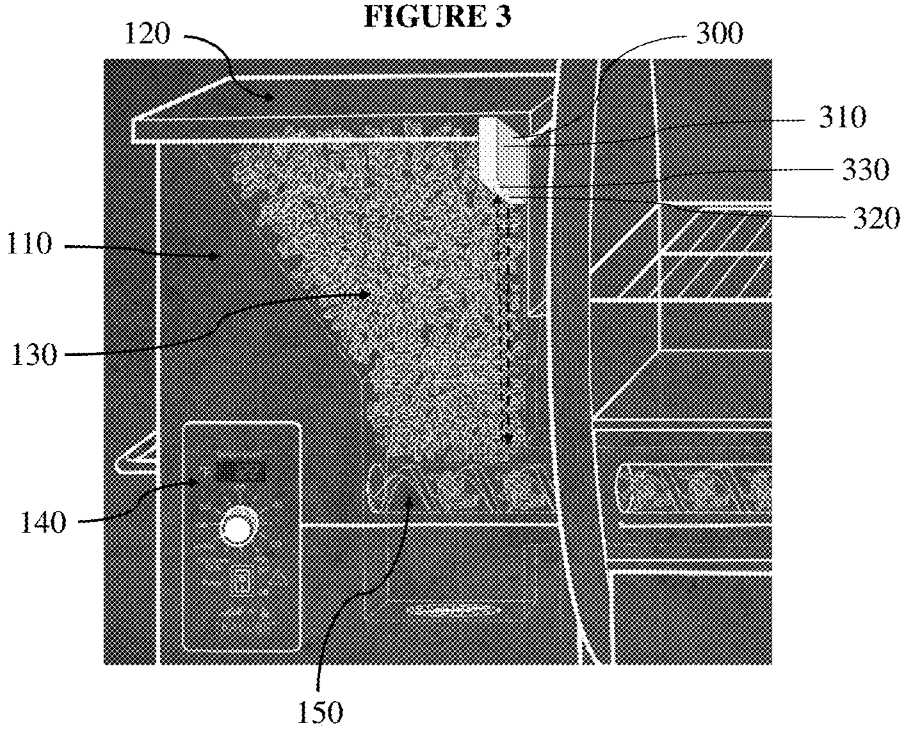
FIG. 3 depicts a hopper with a laser rangefinder-based detection system in accordance with at least one embodiment of the present disclosure.
Figure 4:
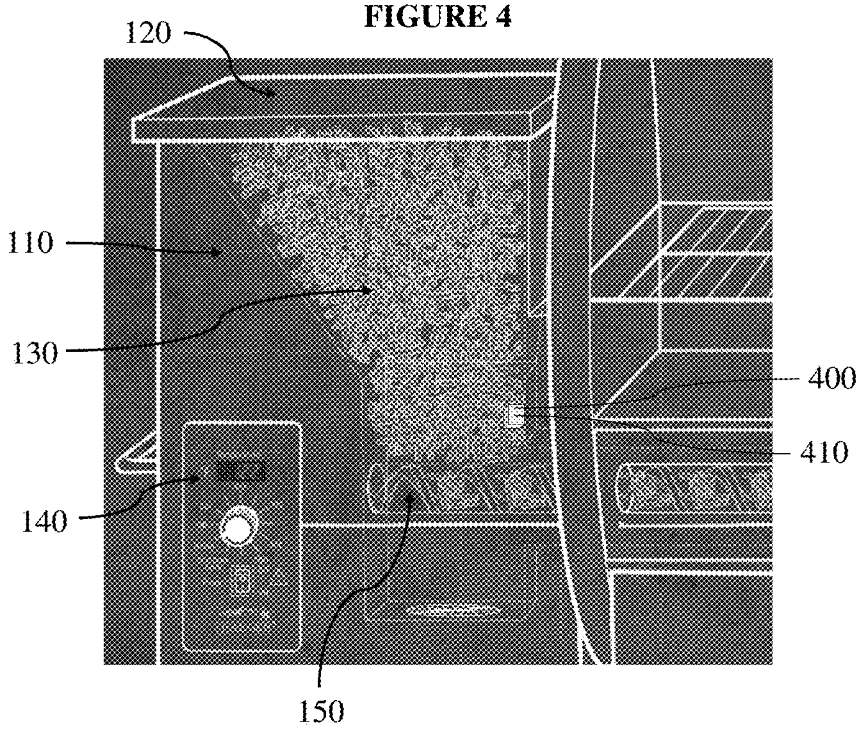
FIG. 4 depicts a hopper with a photodetector-based detection system in accordance with at least one embodiment of the present disclosure.

FIGS. 2-4 depict a hopper 110 with various detection systems configured to detect at least one pellet level in the hopper 110, each in accordance with at least one embodiment of the present disclosure. More specifically, FIG. 2 depicts a hopper 110 with a light-based detection system 200. As shown, the light-based detection system can include lights 210*a-e* that are disposed at one or more threshold levels in the hopper cavity 130, and corresponding light sensors 220*a-e* configured to detect light emitted from the lights 210*a-e*.

In at least one implementation, the light-based detection system 200 detects the pellet level in the hopper cavity 130 at the threshold levels where the manufacturer or user positions the lights 210*a-e*. As the hopper cavity 130 empties and the pellet level diminishes, the pellets can uncover the lights 210*a-e* and the corresponding light sensors 220*a-e*. When the lights 210*a-e* are uncovered, the light emitted by the lights 210*a-e* is no longer blocked by pellets. Therefore, the corresponding light sensors 220*a-e* can detect the light emitted by the lights 210*a-e*, and the light-based detection system 200 can signal to the user that the pellet level has dropped below at least one of the threshold levels.

For example, when the pellet level drops below the light 210*a*, the light emitted by the light 210*a* is no longer covered by pellets, so the corresponding light sensor 220*a* can detect the light emitted by the light 210*a*. Then, the light-based detection system 200 can signal to the user that the pellet level is below the light 210*a*.

Embodiments of the present disclosure are not limited to the light-based detection system 200 shown in FIG. 2. One skilled in the art will recognize that although FIG. 2 shows the light-based detection system with five lights 210*a-e* and five corresponding light sensors 220*a-e*, any number and combination of lights and corresponding light sensors may be used in accordance with the present disclosure. For example, a light-based detection system 200 may include two lights 210 that are disposed at threshold levels, and a single corresponding light sensor 220 configured to detect light emitted by the two lights 210.

Also, although not shown, the light-based detection system 200 can also include one or more reflectors. Such reflectors can be coupled with one or more lights 210 and/or one or more corresponding light sensors 220.

Further, in at least one embodiment of the present disclosure, the light-based detection system 200 is comprised of multiple, single light 210 and corresponding light sensor 220 units disposed at threshold levels throughout the hopper cavity 130. Such an implementation can be helpful if the way in which the pellets empty from the hopper cavity 130 is unpredictable. As stated above, a hopper cavity 130 can empty from the center or from a specific side first, leading to uneven levels of pellets within the hopper. Therefore, having the light-based detection system 200 disposed on one side of the hopper cavity 130, as shown in FIG. 2, can lead to an inaccurate measurement of the level of pellets in the hopper cavity 130. However, the manufacturer or user could measure the various levels of pellets within the hopper 110 by disposing single light 210 and corresponding light sensor 220 units at various points along the sides of the hopper cavity 130, along the same horizontal plane.

At least one embodiment of the present disclosure comprises a single light sensor 220 disposed at or near the top of the hopper cavity 130. One or more lights 210 can be disposed at various levels within the hopper cavity 130, and each of the one or more lights 210 can be configured to emit a distinctive wavelength of light or flashing light pattern. The single light sensor 220 can be configured to detect the distinctive light emitted from the one or more lights 210, and thereby determine the level of pellets in the hopper cavity 130.

Also, a threshold level can be any level within the hopper cavity 130. In at least one implementation the light-based detection system 200 comprises one light 210 and one corresponding light sensor 220 disposed near the bottom of the hopper cavity 130. Therefore, the light-based system 200 can detect when the pellet level in the hopper cavity 130 is substantially near empty and needs to be refilled. Further, the light-based detection system 200 is not limited to its position in the hopper cavity 130. The light-based detection system 200 may be placed anywhere within the hopper 110 in accordance with the present disclosure.

FIG. 3 depicts a hopper 110 with a laser-based detection system 300. As shown, the manufacturer or user can position a laser rangefinder 310 near the hopper lid 120 and configure the laser rangefinder 310 to measure the distance between the laser rangefinder 310 and the level of pellets in the hopper cavity 130.

More specifically, the laser rangefinder 310 includes a laser emission aperture 320 that emits a laser beam, as shown in FIG. 3. FIG. 3 also shows that the laser rangefinder 310 can include a laser receiving aperture 330 that is configured to receive the laser beam after it reflects off the pellets. The distance between the laser rangefinder 310 and the level of pellets in the hopper cavity 130 can be calculated using the time it takes for the laser beam to reach the pellets, reflect off the pellets, and reach the laser receiving aperture 330.

In at least one embodiment of the present disclosure, the laser-based detection system 300 is configured to notify the user when the pellet level reaches a threshold level near the bottom of the hopper cavity 130. Additionally or alternatively, the laser-based detection system 300 is configured to measure the distance between the laser-based detection system 300 and the level of pellets at predetermined time intervals. In at least one embodiment of the present disclosure, the laser-based detection system 300 is configured to allow the user to determine when the distance between the laser-based detection system 300 and the level of pellets is measured. Similarly, in at least one implementation, the user can set specific threshold levels at which the laser-based detection system 300 notifies the user.

One skilled in the art will appreciate that the laser-based detection system 300 is not limited to that shown in FIG. 3. The manufacturer or user can place the laser rangefinder 310 anywhere within the hopper 110 where the laser emission aperture 320 can emit a laser beam and the laser receiving aperture 330 can receive the laser beam after it reflects off the pellets. For example, the manufacturer or user may position the laser rangefinder 310 at an angle in the hopper 110 such that the laser measures the area where the pellets empty first. If the hopper empties from the center, the user or manufacturer can position the laser rangefinder 310 so the pellet level in the center of the hopper cavity 130 is measured.

FIG. 4 depicts a hopper 110 with a photodetector-based detection system 400. As shown in FIG. 4, the photodetector-based detection system 400 can include a photodetector 410, which is configured to detect light when the pellet level no longer covers the photodetector 410. The light detected by the photodetector 410 may come from any natural light, or a light source (not shown) disposed within the hopper 110. When the photodetector 410 detects light, the photodetector-based detection system 400 can notify the user that the pellet level has dropped below the level of the photodetector 410.

Although FIG. 4 shows a photodetector-based detection system 400 with one photodetector 410, the present disclosure is not so limited. The photodetector-based detection system 400 may comprise any number of photodetectors 410 disposed at threshold levels within the hopper cavity 130.

Figure 5:
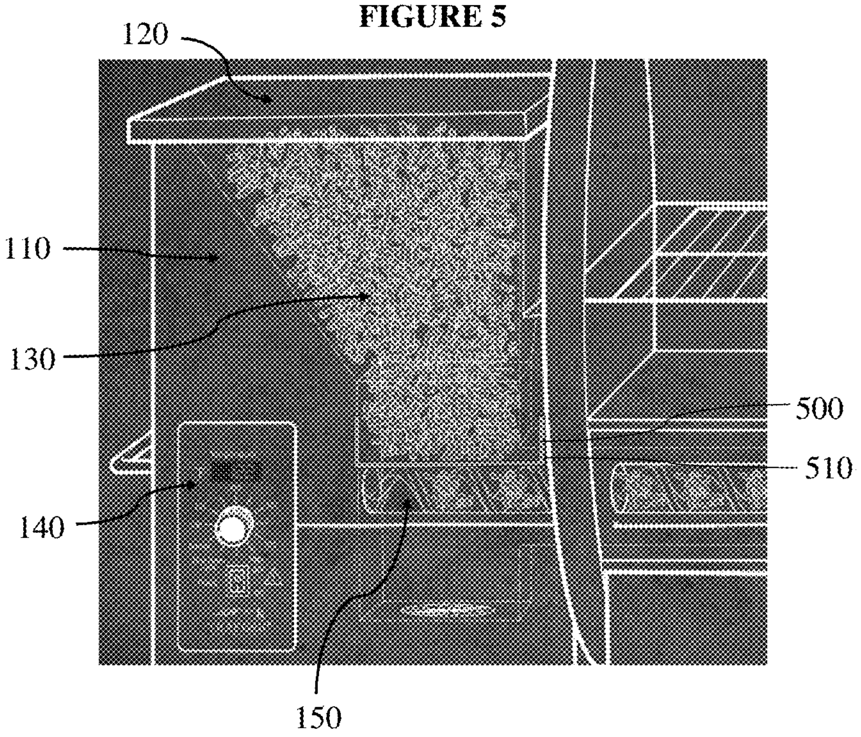
FIG. 5 depicts a hopper with a weight-based detection system in accordance with at least one embodiment of the present disclosure.

FIG. 5 shows a weight-based detection system 500. As seen in FIG. 5, the weight-based detection system can include a scale 510 disposed near the bottom of the hopper 110. In at least one implementation, the scale 510 is configured to weigh the amount of pellets in the hopper cavity 130 when the pellet grill 100 is turned on, cooking begins, or when signaled by the user. The weight-based detection system 500 can also be configured to weigh the remaining pellets in the hopper cavity 130 at predetermined time intervals or when signaled by the user. Additionally or alternatively, the scale 510 can be configured to alert the user when the weight of the pellets in the hopper cavity 130 is reduced by predetermined weight increments, e.g., reduced by half.

Figure 6:
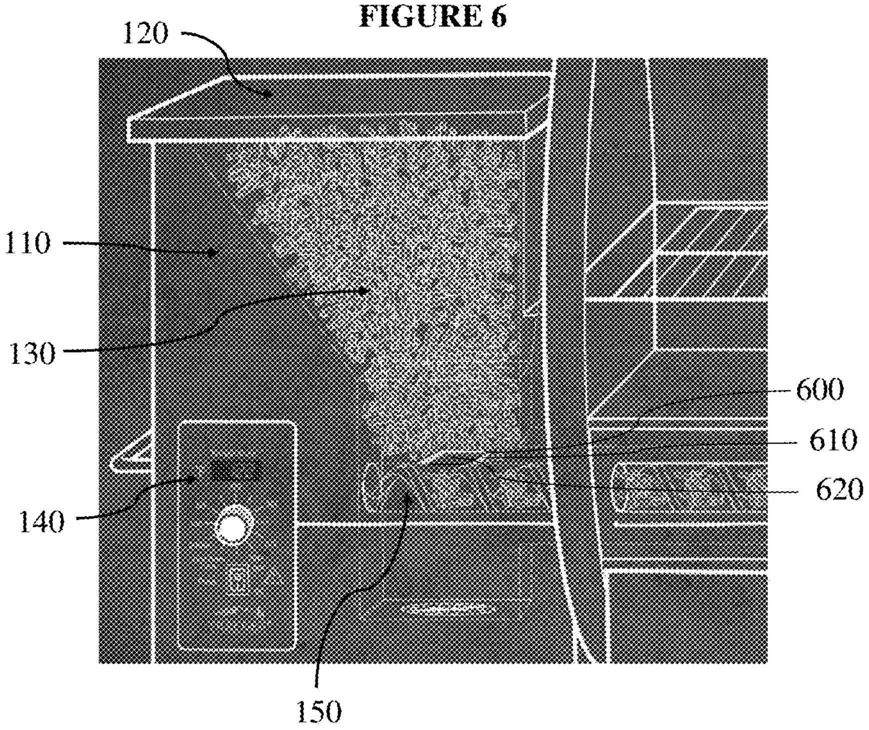
FIG. 6 depicts a hopper with a centralized weight-based detection system in accordance with at least one embodiment of the present disclosure.

FIG. 6 shows a centralized weight-based detection system 600 that is similar to the weight-based detection system 500 shown in FIG. 5, but the target weigh area is limited to the area around where the hopper 110 feeds pellets into the auger system 150. As shown in FIG. 6, the centralized weight-based detection system 600 can include a centralized scale 610 that surrounds the hole 620 that connects the hopper 110 to the auger system 150.

The centralized weight-based detection system 600 may provide a more accurate pellet measurement because of the potential the hopper cavity 130 has for emptying in a non-uniform pattern. For example, pellets may stack up on the sides of the hopper cavity 130 but not feed through the hole 620 into the auger system 150. The weight-based detection system 500 measures the hopper cavity 130 as a whole, so the pellets stuck on the side would be counted in the weight measurement. Therefore, the weight-based detection system 500 can inaccurately report to the user that the hopper cavity 130 has sufficient pellets to heat the pellet grill 100, but in reality, pellets are no longer feeding into the auger system 150. Because the centralized weight-based detection system only measures the area surrounding the hole 620, it can more accurately detect when pellets are no longer feeding into the auger system 150.

One skilled in the art will appreciate that the weight-based detection system 500 and the centralized weight-based detection system 600 are not limited to size, shape, position, etc., shown in FIGS. 5 and 6, respectively. The weight-based detection system 500 and/or the centralized weight-based detection system 600 may comprise any system that measures the weight, mass, and/or pressure of pellets in the hopper 110, or a specific area in the hopper cavity 130.

Figure 7:
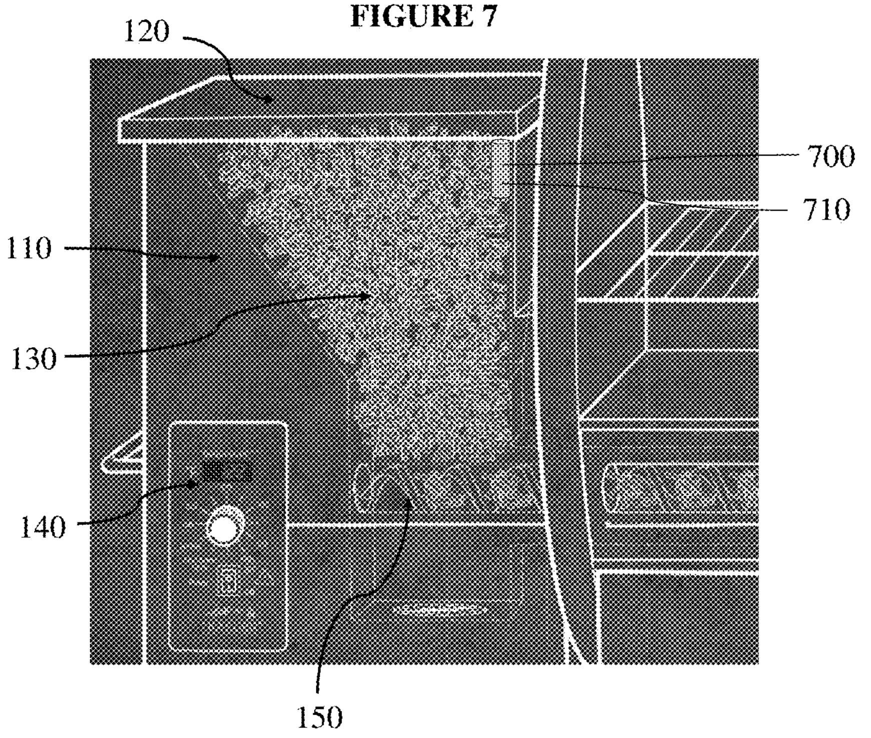
FIG. 7 depicts a hopper with a capacitive sensor-based detection system in accordance with at least one embodiment of the present disclosure.

FIG. 7 shows a capacitive sensor-based detection system 700 disposed near the hopper lid 120, which includes a capacitive sensor 710. In at least one implementation, the capacitive sensor 710 is configured to measure the distance between the capacitive sensor 710 and the pellets in the hopper cavity 130. Additionally or alternatively, in at least one implementation, a conductive element is be placed on the surface of the pellets so the capacitive sensor 710 can better detect small changes in the level of the pellets in the hopper cavity 130.

The capacitive sensor-based detection system 700 can be configured to measure the distance between the capacitive sensor 710 and the pellets in the hopper cavity 130 at predetermined time intervals or when signaled by the user. Further, while FIG. 7 shows the capacitive sensor-based detection system 700 disposed on the side of the hopper cavity 130, near the hopper lid 120, the present disclosure is not so limited. The capacitive sensor-based detection system 700 can be disposed anywhere where it can detect changes in the pellet level within the hopper cavity 130.

Further, the capacitive sensor-based detection system 700 can include more than one capacitive sensor 710, placed anywhere within the hopper 110. For example, because hoppers 110 can empty pellets in a non-uniform manner, multiple capacitive sensors 710 can be used to measure the distance between the capacitive sensors 710 and the pellets in multiple places within the hopper cavity 130.

Figure 8:
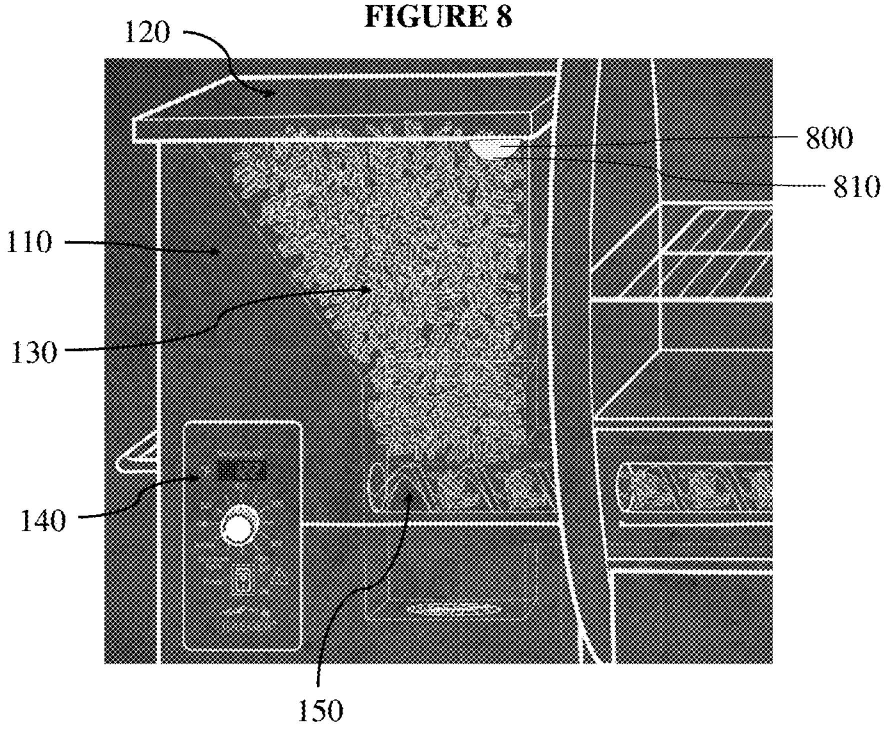
FIG. 8 depicts a hopper with a camera-based detection system in accordance with at least one embodiment of the present disclosure.

A camera-based detection system 800 is shown in FIG. 8, which includes a camera 810. FIG. 8 shows the camera 810 disposed on the side of the hopper cavity 130, near the hopper lid 120, however, the camera 810 may be anywhere within the hopper 110. In at least one implementation, the camera-based detection system 800 includes memory and a processor, and the camera-based detection system 800 can therefore analyze the images captured by the camera 810 and determine the level of pellets within the hopper cavity 130.

In at least one embodiment of the present disclosure, the camera-based detection system 800 is configured to allow the user to determine when the camera-based detection system 800 determines the level of pellets. Similarly, in at least one implementation, the user can set specific threshold levels at which the camera-based detection system 800 notifies the user that the pellet levels within the hopper cavity 130 are low.

Additionally or alternatively, in at least one implementation, the camera-based detection system 800 includes a communications module that is configured to interact with a user's mobile computing device (such as a mobile phone or tablet). The camera-based detection system 800 can be configured to show the user a live image of the hopper cavity 130 at predetermined time intervals or when signaled by the user. In at least one implementation, the camera-based detection system 800 also includes a light that is coupled to the camera 810. The light is configured to illuminate the hopper cavity 130 even when the hopper lid 120 is closed.

Figure 9:
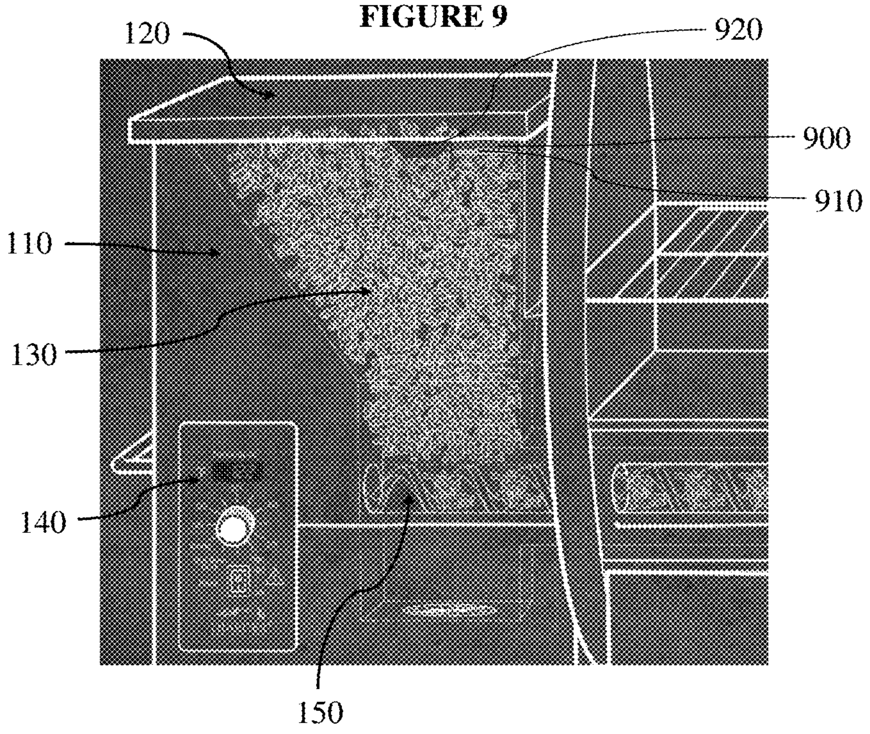
FIG. 9 depicts a hopper with a sound-based detection system in accordance with at least one embodiment of the present disclosure.

FIG. 9 shows a sound-based detection system 900 that includes a transmitter 910 and a receiver 920. The sound-based detection system 900 can be configured to measure the pellet level within the hopper cavity 130 using sound waves. In at least one implementation, the transmitter 910 sends a sound wave, and when the sound wave reaches the level of the pellets, it reflects off the pellets, and is received by the receiver 920. Based on the time taken for the sound wave to reach the receiver 920, the sound-based detection system 900 can determine the pellet level in the hopper cavity 130. The present disclosure is not limited to the use of any wavelength of sound wave.

The present disclosure is not limited to the placement of the transmitter 910 and receiver 920 shown in FIG. 9. In at least one implementation, the user disposes the receiver 920 on the surface of the pellets, and the sound-based detection system 900 determines the pellet level in the hopper cavity 130 by measuring the time taken for the sound wave, sent from the transmitter 910, to reach the receiver 920. The sound-based detection system 900 can be configured to determine the pellet level in the hopper cavity 130 at predetermined time intervals or when signaled by the user.

Further, in at least one implementation, the receiver 920 is disposed at or near the bottom of the hopper cavity 130. The pellets can act as a sound barrier, and therefore, while the receiver 920 is covered, the sound waves sent by the transmitter 910 are not be detected by the receiver 920. However, when the pellet level is low enough that pellets no longer cover the receiver 920, it can detect the sound waves sent by the transmitter 910, and the sound-based detection system 900 can notify the user.

Additionally or alternatively, in at least one implementation, multiple receivers 920 are placed at threshold levels throughout the hopper cavity 130. When pellets uncover one of the receivers 920, it can detect the sound waves sent by the transmitter 910, and the sound-based detection system 900 can notify the user the pellet level in the hopper cavity 130 has dropped below a threshold level.

Figure 10:
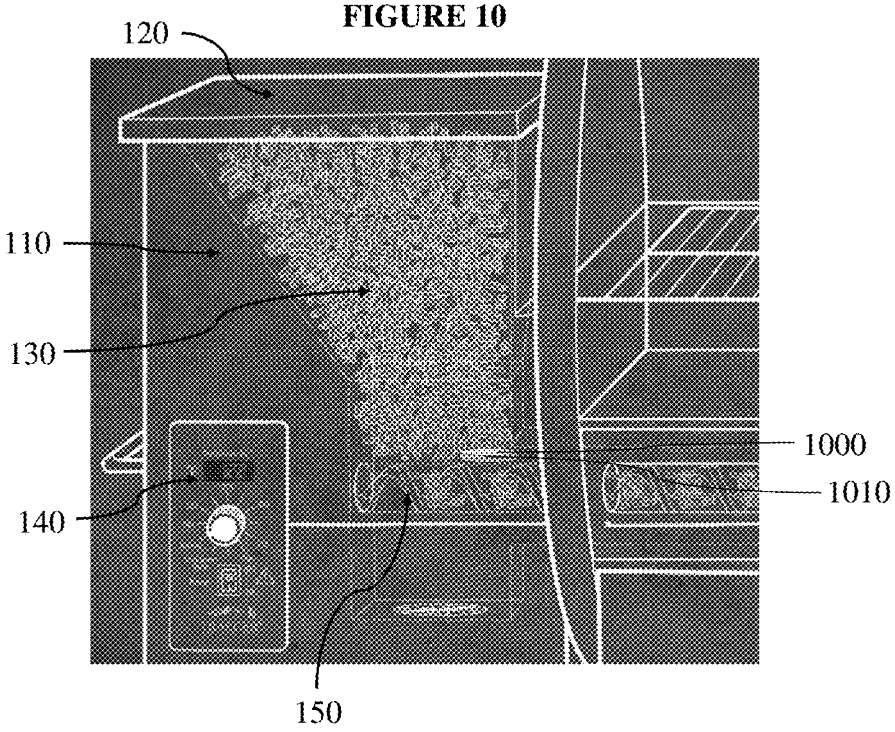
FIG. 10 depicts a hopper with a resistive sensor-based detection system in accordance with at least one embodiment of the present disclosure.

FIG. 10 shows a resistive sensor-based detection system 1000 that includes a resistive sensor 1010. The resistive sensor 1010 can be configured to detect changes in physical pressure over the surface of the resistive sensor 1010. Therefore, as shown in FIG. 10, in at least one implementation, at least one resistive sensor 1010 is placed at the bottom of the hopper cavity 130 to detect changes in pressure caused by the weight of the pellets surrounding the resistive sensor 1010. The resistive sensor-based detection system 1000 can be configured to measure the pressure when the pellet grill 100 is turned on, cooking begins, or when signaled by the user, and then alert the user when the pressure reduces by predetermined weight increments, e.g., reduced by half. The resistive sensor 1010 can also be configured to take pressure measurements at predetermined time intervals or when signaled by the user.

Additionally or alternatively, in at least one implementation, the resistive sensor-based detection system 1000 includes more than one resistive sensor 1010 positioned at a threshold level in the hopper cavity 130. When a resistive sensor 1010 no longer detects the pressure of pellets because the pellet level in the hopper cavity 130 has dropped below the resistive sensor 1010, the resistive sensor-based detection system 1000 can notify the user that the pellet level has dropped below that threshold level.

Figure 11:
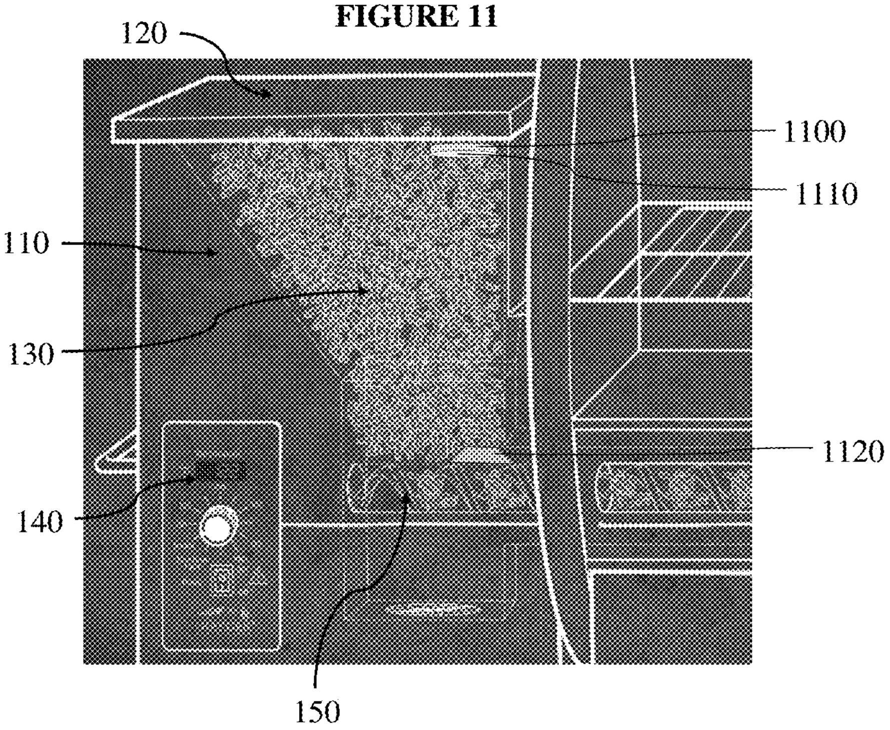
FIG. 11 depicts a hopper with a radio frequency signal strength-based detection system in accordance with at least one embodiment of the present disclosure.

A radio frequency signal strength-based detection system 1100 is shown in FIG. 11. The radio frequency signal strength-based detection system 1100 can include a transmitter 1110 and a receiver 1120. As shown in FIG. 11, the transmitter 1110 is disposed in the hopper cavity 130 near the hopper lid 120, and the receiver 1120 is near the bottom of the hopper cavity 130. The transmitter 1110 can be configured to transmit a radio frequency, and the receiver 1120 can be configured to measure the strength of radio frequency sent by the transmitter 1110. The pellets in the hopper cavity 130 can act as a buffer to the radio frequency, thereby diminishing the signal strength. Therefore, as the level of pellets in the hopper cavity 130 reduces, the strength of the radio frequency can increase.

One skilled in the art will appreciate that the radio frequency signal strength-based detection system 1100 is not limited to the configuration shown in FIG. 11. In at least one implementation, the user places the receiver 1120 on top of the pellets in the hopper cavity 130, and as the pellet level reduces, the strength of the radio frequency decreases because the distance between the transmitter 1110 and receiver 1120 increases.

Figure 12:
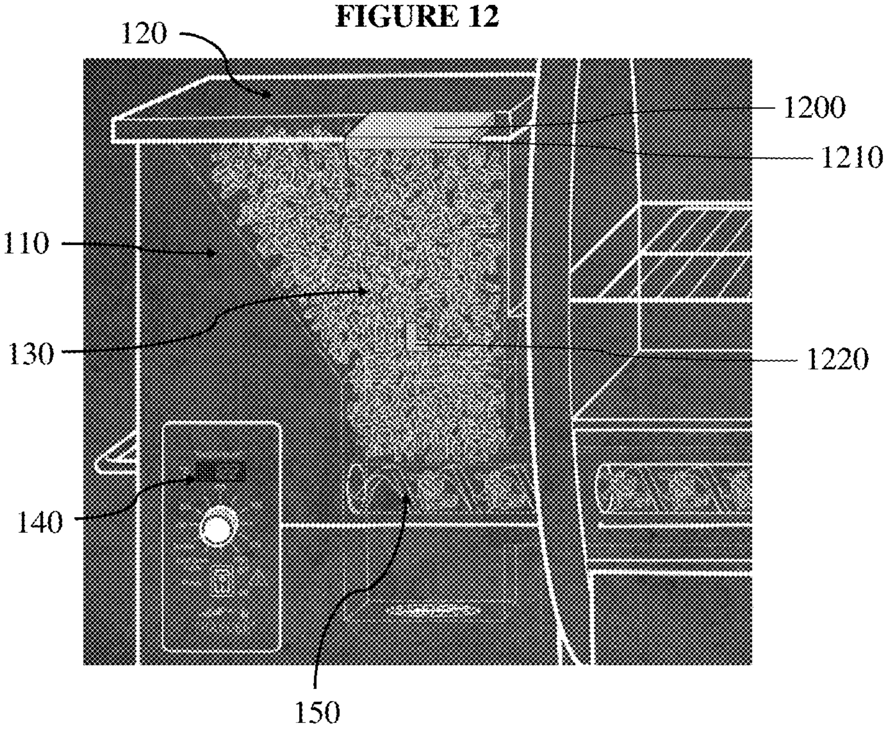
FIG. 12 depicts a hopper with a physical switch-based detection system in accordance with at least one embodiment of the present disclosure.

FIG. 12 shows physical switch-based detection system 1200. As shown in FIG. 12, the physical switch-based detection system 1200 can include a floating element 1210 and a physical switch 1220, which is disposed at a threshold level within the hopper cavity 130. The user can place the floating element 1210 on the surface of the pellet level in the hopper cavity 130, and when the pellet level reaches the physical switch 1220, the floating element 1210 triggers the physical switch 1220, and the physical switch-based detection system 1200 can notify the user that the pellet level has reached the threshold level in the hopper cavity 130.

The physical switch-based detection system 1200 is not limited to that shown in FIG. 12. The physical switch-based detection system 1200 can include any kind of floating element 1210 capable of triggering a physical switch 1220. Further, more than one physical switch 1220 can be disposed at a threshold level within the hopper cavity 130.

One advantage in measuring multiple threshold levels in the hopper cavity 130 using any of the detection systems is that the detection system can be configured to estimate the time left until the hopper cavity 130 is empty based on factors such as the consumption rate of pellets, cooking temperature, and type of pellets used by the user. Additionally or alternatively, the detection system, in combination with the temperature gauge 140 can be configured to use a regression equation to make a best fit line for calibrating to the geometry of a specific hopper 110. Alternatively, a generic regression equation can be used in conjunction with a user activated calibration to best fit the user's hopper 110 to "our pellet measuring."

One skilled in the art will appreciate that multiple detection systems can be coupled and used together. For example, a centralized weight-based detection system and camera-based detection system can be used in the same hopper 110 to measure the pellet level. Therefore, the term "the detection system" is used herein to indicate one or more detection systems.

A manufacturer can dispose the detection system in a pellet grill 100 and sell the pellet grill 100 to a user with the detection system pre-installed. Alternatively, or additionally, users can buy the detection system separately from a pellet grill 100 and install the detection system themselves. For example, the user may already own a grill that does not have a detection system, so he or she could purchase a detection system, and install the detection system in his or her grill.

Further, the detection system can be configured to send the user live updates concerning the level of pellets in the hopper cavity 130. In at least one implementation, the pellet grill 100 includes a low-pellet-warning-indicator, such as a light or sound, that is coupled to the detection system and can be configured to notify the user when the pellet level drops below a threshold level. In at least one implementation, the detection system is configured to notify the user only when the hopper cavity 130 is empty, rather than at multiple threshold levels.

In at least one implementation, the detection system is also coupled to one or more other sensors disposed inside or outside the pellet grill 100, e.g., a sensor to detect the lid opening and/or closing. The detection system in combination with one or more other sensors can sense pellets bridging in the hopper cavity 130, an empty hopper cavity 130, and/or a jammed auger system 150 by determining actual pellet delivery to the auger system 150 and firepot 160. The one or more other sensors can also be used to determine what kind of pellets (e.g., brand, shape, size, etc.) the user loads into the hopper 110. In at least one implementation, one or more other sensors determine pellet conditions, like the humidity, and then the detection system sends the user recommendations for best performance given the detected conditions. The one or more other sensors can also be configured to detect smoke in the hopper, and when smoke is detected, the detection system can signal the pellet grill 100 to take a corrective action.

Additionally, the one or more other sensors can also be configured to detect covers, structures, the user, and other individuals. The detection system coupled to the one or more other sensors can be configured to signal to the pellet grill 100 specific operating actions. For example, if the one or more other sensors detect a cover, the detection system can signal to the pellet grill 100 to turn off or remain off until the user removes the cover. If no cover is sensed, and the one or more other sensors detect a proximate user, the detection system can signal to the pellet grill 100 to power up on the approach of the user. Finally, if the one or more other sensors detect a child is close to the pellet grill 100, the detection system can signal to the pellet grill 100 to turn off, or alert the user. One skilled in the art will appreciate that embodiments of the present disclosure are not limited to these examples.

The detection system can be powered in any way. For example, the detection system can use energy harvesting schemes such as TEC/Peltier, solar, or mechanical devices. In at least one implementation, the detection system is battery powered, and the one or more other sensors are configured to detect when the detection system does not need to be used so battery power can be conserved.

On any optical sensors, the manufacturer can design ridges on an optical sensor lens to space pellets away from the lens and protect the lens from scratches. Also, the lens can be made from or comprise a layer of an antistatic resin to reduce the amount of dust accumulation on the lens, which could obscure the optical sensor.

Additionally or alternatively, in at least one implementation, the detection system is configured to send the user live updates via Bluetooth or Wi-Fi. The detection system, one or more other sensors, pellet grill 100, and other devices can communicate with each other using a mesh or single access point configuration. For example, the detection systems can include a communications module that is configured to interact with databases, mobile computing devices (such as mobile phones or tablets), and other computing systems. The communications module can be configured to send notifications and receive inputs from a mobile computing device. In at least one implementation, the mobile computing device has an installed mobile application that is configured to receive notifications from and send instructions to the communications module. Additionally or alternatively, the detection systems include hardware elements including a processor, memory, a receiver, a transmitter, various communication radios in the communications module, and other hardware elements.

In at least one embodiment of the present disclosure, the mobile application includes a pellet sales feature. The detection systems can be coupled to the mobile application, and can in part or wholly drive the pellet sales by tracking the usage of the pellets. The mobile application can also include a feature that allows the user to determine when the detection system notifies he or she about the hopper level. For example, the user can use the mobile application to configure the detection system to send him or her a notification when the hopper cavity 130 is half full, and when the hopper cavity 130 is empty.

Further, in at least one implementation, the user uses the mobile application to configure when the detection system measures the pellet level in the hopper cavity 130. For example, the user can configure the detection system to measure the pellet level every ten minutes. Alternatively, the user can configure the detection system to measure the pellet level only when signaled by the user.

Embodiments of the present disclosure include at least one method for detecting at least one pellet level in a hopper, wherein the method includes detecting at least one pellet level in a hopper. In at least one implementation, the method further comprises notifying the user of the at least one pellet level in the hopper.

Additional non-limiting example embodiments of the present disclosure are set forth below.

Embodiment 1: a pellet grill, comprising: a main grilling cavity; a hopper configured to contain particulate fuel prior to combustion of the fuel; and a detection system configured to detect at least one pellet level in the hopper of the pellet grill.

Embodiment 2: the pellet grill of Embodiment 1, further comprising: a firepot configured to contain combusting particulate fuel; and an auger for conveying particulate fuel from the hopper to the firepot.

Embodiment 3: the pellet grill of Embodiment 1 or Embodiment 2, wherein the hopper comprises a lid.

Embodiment 4: the pellet grill of Embodiment 3, wherein the detection system is configured to detect at least one pellet level in the hopper of the pellet grill while the lid is closed.

Embodiment 5: the pellet grill of any one of Embodiments 1-4, wherein the detection system comprises at least one sensor configured to detect at least one condition in the pellet grill.

Embodiment 6: the pellet grill of Embodiment 5, wherein the detection system comprises at least one light-emitting device positioned within the hopper, and the at least one sensor comprises at least one light sensor configured to detect light emitted by the at least one light-emitting device.

Embodiment 7: the pellet grill of Embodiment 6, wherein the at least one light-emitting device and the at least one sensor are configured such that particulate fuel within the hopper will prevent light emitted by the at least one light-emitting device from impinging on the at least one sensor when a level of the particulate fuel is at or above the at least one pellet level in the hopper, and such that light emitted by the at least one light-emitting device impinges on the at least one sensor when a level of the particulate fuel is below the at least one pellet level in the hopper.

Embodiment 8: the pellet grill of any one of Embodiments 5-7, wherein the detection system comprises at least two light-emitting devices configured to emit different wavelengths of light, and wherein the at least one sensor is located and configured to detect light emitted by the at least two light-emitting devices.

Embodiment 9: the pellet grill of any one of Embodiments 5-8, wherein the at least one sensor comprises a laser rangefinder positioned within the hopper.

Embodiment 10: the pellet grill of any one of Embodiments 5-9, wherein the at least one sensor comprises a photodetector located within the hopper and configured to detect light impinging on the photodetector when a level of the particulate fuel within the hopper falls below the photodetector.

Embodiment 11: the pellet grill of any one of Embodiments 5-10, wherein the at least one sensor comprises a plurality of photodetectors located at different levels within the hopper, each photodetector of the plurality configured to detect light impinging on the respective photodetector when a level of the particulate fuel within the hopper falls below the respective photodetector.

Embodiment 12: the pellet grill of any one of Embodiments 5-11, wherein the at least one sensor comprises a weight sensor configured to weigh particulate fuel in the hopper.

Embodiment 13: the pellet grill of any one of Embodiments 5-12, wherein the at least one sensor comprises a capacitive sensor, a resistive sensor, or a mechanical switch sensor.

Embodiment 14: the pellet grill of any one of Embodiments 5-13, wherein the at least one sensor comprises a camera.

Embodiment 15: the pellet grill of any one of Embodiments 5-14, wherein the at least one sensor comprises an acoustic sensor.

Embodiment 16: the pellet grill of any one of Embodiments 1-15, wherein the detection system comprises a communications module configured to notify a user of the at least one pellet level in the hopper of the pellet grill.

Embodiment 17: a method for detecting at least one pellet level in a hopper of a pellet grill, the method comprising detecting at least one pellet level in the hopper of a pellet grill.

Embodiment 18: the method of Embodiment 17, wherein detecting at least one pellet level in the hopper of a pellet grill comprises detecting at least one pellet level in the hopper of a pellet grill as recited in any one of Embodiments 1-16.

Embodiment 19: the method of any one of Embodiment 17 or Embodiment 18, further comprising notifying a user of the at least one pellet level in the hopper using a communication module.

Embodiment 20: the method of any one of Embodiments 17-19, wherein detecting at least one pellet level in the hopper of a pellet grill comprises detecting the at least one pellet level in the hopper of the pellet grill using a sensor.

Embodiment 21: the method of Embodiment 20, further comprising detecting the at least one pellet level in the hopper using the sensor without opening a lid of the hopper.

Embodiment 22: the method of Embodiment 20 or Embodiment 21, where the sensor is selected from the group consisting of a light sensor, a laser rangefinder, a camera, an acoustic sensor, a capacitive sensor, a resistive sensor, and a mechanical switch sensor.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

It is claimed:

1. A pellet grill, comprising:
- a main grilling cavity;
- a hopper configured to contain particulate fuel prior to combustion of the fuel;
- an auger system including an auger located and configured to convey particulate fuel away from the hopper and toward the main grilling cavity; and
- a detection system configured to detect multiple threshold pellet levels in the hopper of the pellet grill and configured to estimate the time left until the hopper is empty, the multiple threshold pellet levels positioned above a bottom of the hopper and above the auger, the detection system including:
  - at least one light-emitting device positioned at each of the multiple threshold pellet levels in the hopper and configured to emit a different wavelength of light at each of the multiple threshold levels; and
  - at least one light sensor positioned in another portion of the hopper, the at least one light sensor configured to detect light from the at least one light-emitting device.

2. The pellet grill of claim 1, further comprising:

a firepot configured to contain combusting particulate fuel; and an auger for conveying particulate fuel from the hopper to the firepot.

3. The pellet grill of claim 1, wherein the hopper comprises a lid.

4. The pellet grill of claim 3, wherein the detection system is configured to detect at least one pellet level of the multiple threshold pellet levels in the hopper of the pellet grill while the lid is closed.

5. The pellet grill of claim 1, wherein the detection system comprises at least one sensor configured to detect at least one condition in the pellet grill.

6. The pellet grill of claim 1, wherein the at least one light-emitting device and the at least one sensor are configured such that particulate fuel within the hopper will prevent light emitted by the at least one light-emitting device from impinging on the at least one sensor when a level of the particulate fuel is at or above an associated threshold level of the multiple threshold pellet levels in the hopper, and such that light emitted by the at least one light-emitting device impinges on the at least one sensor when a level of the particulate fuel is below the associated threshold level in the hopper.

7. The pellet grill of claim 1, wherein the detection system comprises at least two light-emitting devices configured to emit different wavelengths of light, and wherein the at least one sensor is located and configured to detect light emitted by the at least two light-emitting devices.

8. The pellet grill of claim 5, wherein the at least one sensor comprises a laser rangefinder positioned within the hopper.

9. The pellet grill of claim 5, wherein the at least one sensor comprises a photodetector located within the hopper and configured to detect light impinging on the photodetector when a level of the particulate fuel within the hopper falls below the photodetector.

10. The pellet grill of claim 9, wherein the at least one sensor comprises a plurality of photodetectors located at different levels within the hopper, each photodetector of the plurality configured to detect light impinging on the respective photodetector when a level of the particulate fuel within the hopper falls below the respective photodetector.

11. The pellet grill of claim 5, wherein the at least one sensor comprises a weight sensor configured to weigh particulate fuel in the hopper.

12. The pellet grill of claim 5, wherein the at least one sensor comprises a capacitive sensor, a resistive sensor, or a mechanical switch sensor.

13. The pellet grill of claim 5, wherein the at least one sensor comprises a camera.

14. The pellet grill of claim 5, wherein the at least one sensor comprises an acoustic sensor.

15. The pellet grill of claim 1, wherein the detection system comprises a communications module configured to notify a user of at least one pellet level of the multiple threshold pellet levels in the hopper of the pellet grill.

* * * * *